Patented Nov. 23, 1926.

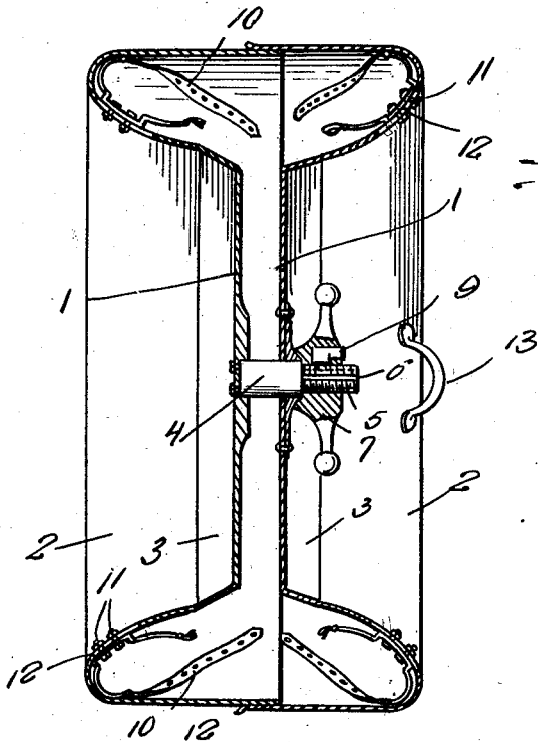
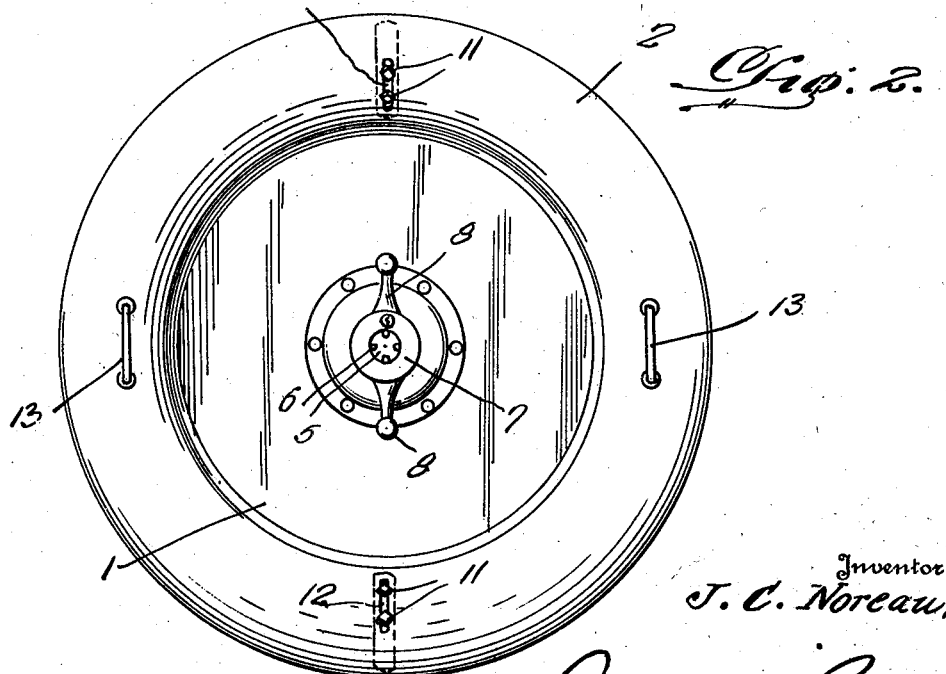

1,607,778

UNITED STATES PATENT OFFICE.

JEAN CHARLES NOREAU, OF QUEBEC, QUEBEC, CANADA.

SPARE WHEEL AND TIRE CARRIER.

Application filed November 12, 1924. Serial No. 749,489.

This invention relates to an improved spare wheel and tire carrier, of the type adapted to be supported upon an automobile, the same being preferably mounted upon the rear end of the latter.

Briefly, the improved carrier embodies a casing made up of a pair of symmetrical half sections, each fashioned to accommodate a tire, with the adjacent portions shaped to accommodate a disc wheel.

More specifically, the improved casing comprises telescopically connected half sections, each embodying a central discular portion carrying a peripheral channel shaped portion, shaped to accommodate a tire, the discular portions being connected together by means embodying a key controlled lock for preventing unauthorized access to the casing.

One feature of the invention is the adjustably mounted tire encircling straps which are provided for accommodating different sizes of tires, and would serve to effectively retain a tire in the channel shaped portion of each of the halves.

Another feature is the novel means connecting the half sections together, and embodying key controlled clamping means.

Other features and advantages of the invention will become apparent from the following description and drawing.

In the accompanying drawing, forming a part of this application, and in which like numerals are employed to designate like parts throughout the same:

Figure 1 is a central vertical section, with parts in elevation, through a carrier constructed in accordance with the present invention.

Figure 2 is a side elevation of the improved carrier.

As before stated, the carrier is composed in the main of a pair of duplicate or substantially symmetrical half sections. Each half section comprises a central discular part 1, equipped with a lateral portion 2, which is substantially channel shaped in cross section. The free edges of the channel shaped portions are adapted to telescopically engage each other, as seen in Figure 1, to hold the sections in assembled relation. It will be noted that the intervening portions 3 are shaped to accommodate a wheel rim.

Rigidly secured to the left hand disc 1 is a cylindrical stud 4, which extends through a reinforced opening formed in the opposed disc. The outer end of the stud is reduced somewhat and screw threaded, as indicated at 5. Also, this screw threaded portion is provided with circumferentially spaced longitudinal grooves 6. A clamping nut is adapted to be threaded on the part 5, to maintain the half sections in assembled relation. If desired, the nut may be provided with diametrically opposite handles for convenience of rotation. As seen more plainly, in Figure 1, the nut is equipped with a lock containing barrel 9, the bolt of which (not shown) is adapted to be projected into one of the aforesaid grooves 6, to prevent unauthorized rotation and removal of the clamping nut.

In practice, the lock may be a conventional control structure.

As before intimated, I provide tire encircling straps 10, for maintaining the tires in place, and I use two of these straps with each tire receiving channel. They may be disposed at diametrically opposed points, as shown, and in order that they may accommodate tires of different diameters, they are equipped with retaining bolts 11 between their ends slidably mounted in slots 12. With this arrangement, it is obvious that the studs can be adjusted to shift the tire, to more accurately fit in the so-called channel. For convenience in separating, the outer half section is provided with handles 13.

In practice, the half sections are separated by removing the clamping nut and the outer section is removed. The inner section is preferably mounted by appropriate brackets (not shown) upon the body of the automobile. With the outer section off, the tire can be struck into the channel 2, of the stationary section. The encircling straps being adjusted to the desired position to accommodate the particular diameter of the tire to be carried, another tire is strapped into the movable section, and the latter is fitted onto the stationary section, in the manner seen. Now, the clamping nut is threaded in place, and the bolt of the lock projected into the adjacent channel to prevent unauthorized turning or removal of the nut. As before stated, a disc wheel may be placed between the discular portions of the sections with its rim resting upon the divergent portion joined with the peripheries thereof. In this instance, the projection 4 will pass through the hub opening of the wheel.

I claim:

A combined wheel and tire carrier of the class described comprising a casing embodying a pair of substantially duplicate complemental sections, said sections embodying opposed spaced parallel central disc-like portions surrounded by marginal tire receivers of channel-shaped cross-section, said receivers having their open sides disposed toward each other, the lower wall of each receiver being curved to conform somewhat to the portion of the tire which it is adapted to contact and the remaining wall being substantially flat, the free edges of the flat outer walls of said receivers being disposed inwardly of the central disc-like portions and being in telescoping contact, separate tire encircling straps adjustably mounted in each receiver, and means for maintaining said sections in assembled relation.

In testimony whereof I affix my signature.

JEAN CHARLES NOREAU.